United States Patent [19]

Trotman et al.

[11] 4,435,015

[45] Mar. 6, 1984

[54] UNDERBODY CUSHIONING AND VENTILATING STRUCTURE AND GENERAL UTILITY FORMED PLASTIC SHEET

[76] Inventors: Helen H. Trotman; Herbert H. Trotman, both of P.O. Box 807, Virginia Beach, Va. 23451

[21] Appl. No.: 181,466

[22] Filed: Aug. 26, 1980

Related U.S. Application Data

[63] Continuation-in-part of Ser. No. 138,929, Apr. 10, 1980, abandoned.

[51] Int. Cl.³ .............................................. A47C 7/02
[52] U.S. Cl. ...................................... 297/453; 5/468; 428/178
[58] Field of Search .......... 297/453, DIG. 1, DIG. 2; 98/1; 428/178, 180, 160, 161, 141, 118, 59, 32, 132, 177; 267/143, 145, 146; 264/322; 156/470, 209; 5/468

[56] References Cited

U.S. PATENT DOCUMENTS

| | | | |
|---|---|---|---|
| 1,568,471 | 1/1926 | Roemer | 5/468 X |
| 2,078,396 | 4/1937 | MacEwan | 5/468 |
| 2,781,820 | 2/1957 | Rogers | 428/178 |
| 3,219,514 | 11/1965 | De Roysancour | 428/178 |
| 3,356,562 | 12/1967 | Graham et al. | 264/293 X |
| 3,370,520 | 2/1968 | Mauch | 98/1 |
| 3,514,156 | 5/1970 | Fields | 297/453 |
| 3,722,955 | 3/1973 | Trotman | 297/453 |
| 3,940,183 | 2/1976 | Seltzer et al. | 297/453 |
| 4,205,880 | 1/1980 | Trotman et al. | 5/468 X |
| 4,333,979 | 6/1982 | Sciaraffa et al. | 428/180 X |

Primary Examiner—James T. McCall
Attorney, Agent, or Firm—James J. Shanley

[57] ABSTRACT

A composite underbody cushioning and ventilating structure of general use and especially useful as a seat pad for the occupants of vehicles, formed of two sheet members with padding material between them, one sheet member being of woven, fibrous decorative material designed for ready passage of air therethrough and the other sheet member being a formed plastic three-dimensional preferably air impervious sheet member that serves the multi-purposes of (a) spacing the sheet members apart for passage of ventilating air between them; (b) presenting an exterior surface that ventilates by lateral air movement and thermal current air movement within local areas of the member; (c) acting as a support for a body while contacting the body in measurably less than 50% of the area of the body; and (d) presenting an exterior surface having a decorative appearance. The present invention also involves the features of the formed plastic sheet member, per se.

9 Claims, 7 Drawing Figures

UNDERBODY CUSHIONING AND VENTILATING STRUCTURE AND GENERAL UTILITY FORMED PLASTIC SHEET

RELATED APPLICATION

This patent application is a continuation in part of application Ser. No. 138,929 filed Apr. 10, 1980, now abandoned.

BACKGROUND OF THE INVENTION

This invention relates to a composite underbody cushioning and ventilating structure, more particularly to such structures where used as seat pads for occupants of motor vehicles. The invention also relates to an improved sheet material of general use formed from a single sheet of thermally formable plastic material.

The composite underbody cushioning and ventilating structure of the present invention is an improvement on the invention covered by U.S. Pat. No. 3,722,955 to Herbert H. Trotman, co-inventor in the present application.

Ventilated seat cushions for general use and for use in vehicles conventionally include a fabric cover having an exposed seating surface and a support structure which provides for ventilation while maintaining the fabric cover spaced above the vehicle seat to form a ventilating space under the body of the seat occupant. The cover fabric is generally foraminous to allow free passage of air into and out of the ventilating space. The cover material normally has a decorative appearance because it is exposed to view in use and this feature is also important from the standpoint of saleability. Representative patents in the prior art are: U.S. Pat. Nos. 3,162,487, 3,162,488, 3,940,183 and 4,143,916 none of which is anticipatory or taken singly or in any combination teach the present invention.

In the past, as illustrated in U.S. Pat. No. 3,722,955, these seat cushions had an upper side and a lower side, the upper side intended for body support contact and the lower side intended for spacing the body support side above the vehicle seat to permit ventilation between the two sides. The seat cushions preceding that of U.S. Pat. No. 3,722,955 had the disadvantage of the susceptibility of the cover fabric being subject to lateral scrubbing movement across the ventilating support structure. This scrubbing action resulted in the breakage of the cover fabric and other fast-wearing detrimental factors. The invention of U.S. Pat. No. 3,722,955 sought to correct the earlier faults in these types of seat cushions.

The present invention departs from previous concepts by providing a seat cushion which utilizes to the fullest advantage the characteristics of thermally moldable sheet plastic while at the same time resulting in a seat cushion which is reversible and has a decorative appearance on both sides.

The present invention can utilize a woven fabric of inherent porosity and ornate appearance on one side and an imperforate, three-dimensionally formed plastic sheet for the other side, the ventilating characteristics of the plastic sheet being achieved by depressions or wells in the surface of the sheet, these wells when considered from the inner side of the plastic sheet also acting to space the two sheets apart in coaction with an optional padding or filler material between the two sheets. The decorative appearance on the plastic sheet side of the seat of the present invention is achieved by simulating woven cane on the outer side of the plastic sheet, such as illustrated in U.S. Pat. No. 3,722,955 but in the present invention the openings in the woven cane are openings in appearance only, this appearance being achieved by the imperforate depressions or wells. As mentioned above, these same depressions or wells form on the inner side of the plastic sheet protuberances which space the two cover sheets apart in coaction with the padding or filler material, where the latter is also used. Thus these elements perform a dual function in the composite seat cushion.

An important aspect of the present invention is the molded form of the imperforate plastic sheet which utilizes thin, thermally formable plastic sheet in the most efficient manner in addition to achieving the decorative appearance and the spacing protuberances.

Accordingly, an important object of the present invention is to provide a reversible ventilating seat cushion having two decorative sides and excellent ventilation characteristics.

A further object of the present invention is to produce a thin, thermally formable plastic sheet formed into the most efficient configuration relative to strength of the plastic sheet and its use for many purposes.

Other objects of the present invention will appear from the following detailed description which, in connection with the accompanying drawings, discloses the preferred embodiment of the invention for purposes of illustration only and not for determination of the limits of the invention. For defining the scope of the invention reference will be made to the appended claims.

SUMMARY OF THE INVENTION

Underbody cushioning and ventilating structure comprising a resilient first sheet member of uniform thickness throughout having an outside surface and an inside surface, a foraminous second sheet member having an outside surface and an inside surface, means attaching the marginal portions of the first and second sheet members to one another with their inside surfaces opposed to form an enclosed space between the sheet members, protuberances integrally formed from the material of the first sheet member projecting inwardly from the inside surface of the first sheet member toward the inside surface of the second sheet member, the protuberances being formed in the first sheet member by the application of heat and pressure to a planar piece of the material of the first sheet member so as to result in the protuberances having side walls of substantially uniform thickness throughout the height of the protuberance, the material of the first sheet member extending between the protuberances being formed by the application of heat and pressure so as to form a continuous pattern of minor cavities and contiguous raised surfaces, the thickness dimension of the portions of the formed sheet between protuberances being non-uniform and shaped to cause turbulence in air currents flowing in contact with them, the protuberances having a height and projecting toward the inside surface of the second sheet a distance such that the first and second sheet members are maintained in spaced ventilating relation by coaction of the protuberances and the inside surface of the second sheet member when the structure is supported by a supporting surface on the outside surface of one sheet member and is supporting a body on the outside surface of the other sheet member.

A resilient sheet of thermally formable plastic initially of substantially uniform thickness throughout and having a frontside and backside, the initial thickness dimension of the sheet being not greater than about one hundredth of an inch, protuberances formed in the sheet in spaced relation from one another projecting from the backside, the protuberances being formed in the sheet by vacuum drawing the frontside of the hot sheet into contact with the outermost surfaces of a plurality of male die protrusions with simultaneous application of gaseous pressure and a plate against the backside of the sheet to force those portions of the sheet between the outermost surfaces of the male die protrusions to stretch into contact with the side wall surfaces of the male die protrusions to thereby form the side walls of the protuberances in the sheet, and thence into thermal forming contact with female surfaces of the die which constitute those surface portions of the die extending between the bases of the male die protrusions, which female surfaces are made up of minor protuberances and contiguous depressions to thereby form a continuous pattern of minor cavities and contiguous raised surfaces in those parts of the sheet extending between protuberances, the portions of the formed sheet between protuberances being non-uniform in the thickness dimension and shaped to cause turbulence in air currents flowing in contact with them.

DESCRIPTION OF THE ILLUSTRATED EMBODIMENT

Figure 4:
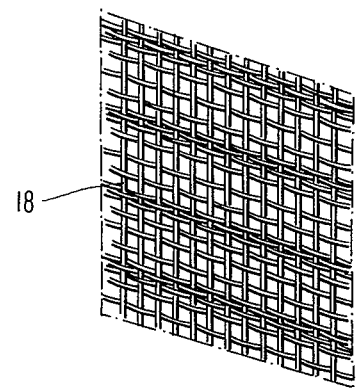
FIG. 4 is an enlarged fragmentary view similar to FIG. 2 of a small section of the back of the embodiment illustrated in FIG. 3.
Figure 1:
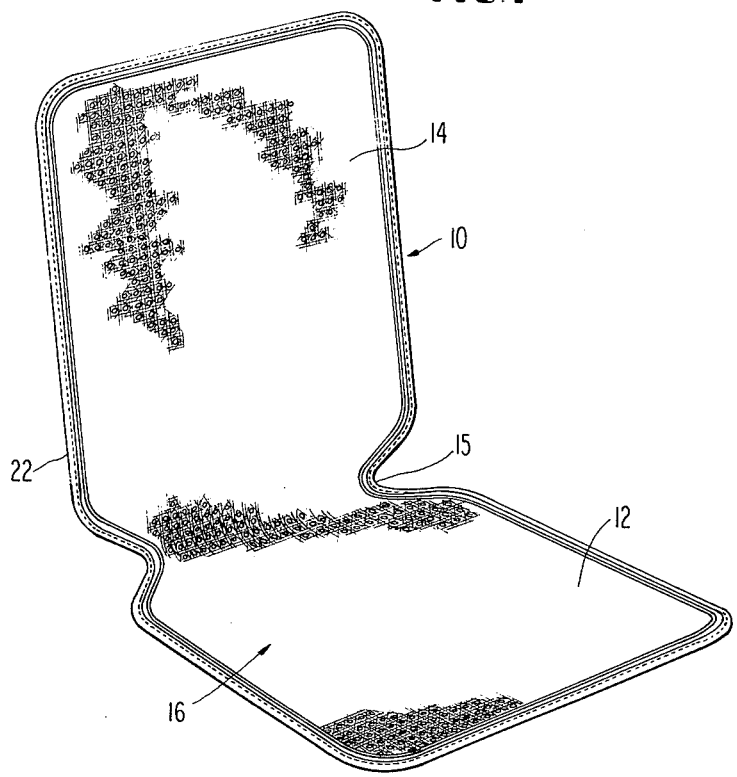
FIG. 1 is a perspective view of the seat cushion of the present invention taken in the direction of the formed plastic sheet side of the seat cushion.
Figure 3:
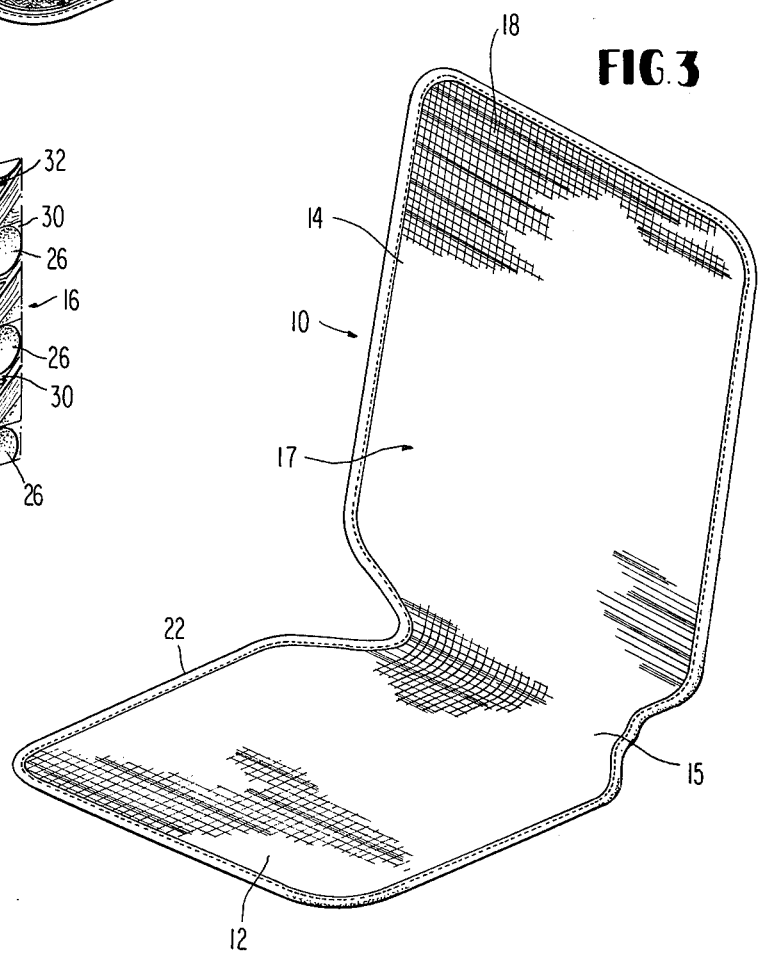
FIG. 3 is a view in perspective taken in the direction of the back of the embodiment illustrated in FIG. 1, illustrating the decorative fabric side of the seat cushion of the present invention.

As shown in FIGS. 1 and 3 an underbody ventilating pad or seat cover 10 is shown having a seat portion 12 and a back rest portion 14. The pad or seat cushion 10 bends along a line of hinging action, as at 15 which can be delineated by a single or a double row of sewing, not illustrated, so that the pad or seat cover can be folded into a configuration in which seat portion 12 extends at an angle to back rest portion 14. The pad or seat cover can consist of only the seat portion or the back portion where desirable.

One side of the seat cushion is made up of a first sheet member in the form of a plastic sheet indicated generally at 16. The other or fabric side, indicated generally at 17, is a second sheet member in the form of any suitable foraminous material, such as a woven fabric 18 made from strands of paper, cotton linen and natural or synthetic fiber.

Figure 7:
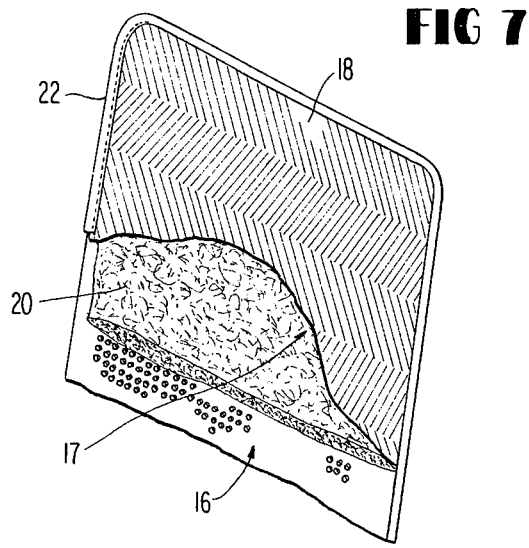
FIG. 7 is a fragmentary view with parts broken away of a portion of the seat cushion as shown in FIG. 3, showing the seat fabric side cut away to expose a random fiber type of padding material and the protuberances as shown on an enlarged scale in FIG. 5.
Figure 6:
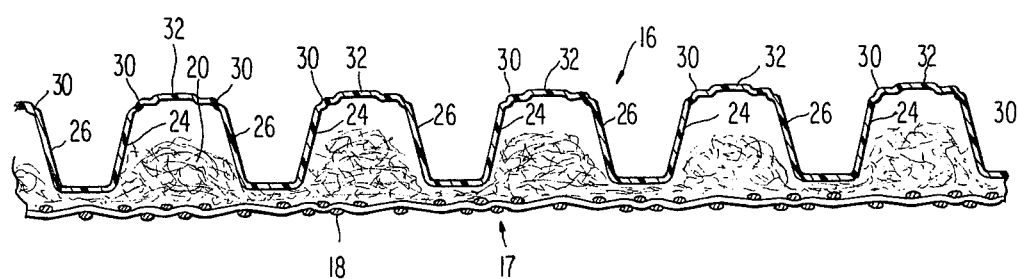
FIG. 6 is a view in cross section taken on any line across the seat cushion as shown in FIG. 1.

As shown in FIGS. 6 and 7, a padding material, which can be an air pervious, randomly disposed plastic or natural fibrous material, is shown at 20, disposed between the formed plastic sheet of cover 16 and the foraminous woven material 18 of cover 17.

A welting 22 is shown extending around the periphery of the seat cushion attaching formed plastic sheet 16 to foraminous woven material 18 of cover 17 around the entire periphery to enclose padding material 20 and cause plastic sheet 16, woven sheet 17 and padding material 20 to act as an integrated structure.

Figure 2:
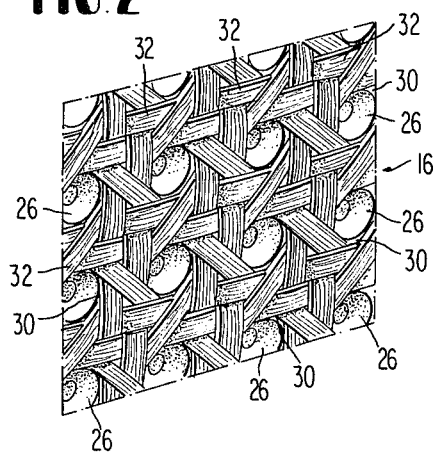
FIG. 2 is an enlarged fragmentary view of a small section of the formed plastic sheet cover as shown in FIG. 1.
Figure 5:
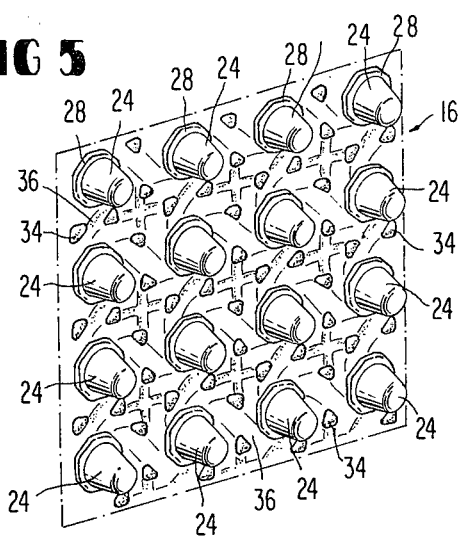
FIG. 5 is a fragmentary enlarged view similar to FIG. 2 of a small section of the back side of the formed plastic sheet shown in FIGS. 1 and 2.

Considering now FIGS. 2 and 5 which are enlarged fragmentary views of the front and back (or the outside and inside, respectively) of the formed plastic sheet 16, a plurality of protuberances 24, considered from the backside or inside of the sheet, form corresponding wells 26 on the front side or outside of the sheet. Protuberances 24 are closely spaced from one another along all dimensions of sheet 16. It will be apparent from the FIG. 5 backside view that the base of each protuberance 24 includes an octagonal portion 28. Returning to FIG. 2, the front side of the sheet, it will be seen that these octagonal portions form corresponding octagonal shaped openings 30 to wells 26, the purpose of which will be apparent in considering the portions of the formed sheet interconnecting the bases of protuberances 24. These interconnecting or intermediate portions of the formed plastic sheet when viewed from the front side, FIG. 2, simulate woven strands of cane, such as pictured in FIG. 2 of U.S. Pat. No. 3,722,955, which in their interlacings form the octagonal openings 30. Thus looking at the front or outside of sheet 16 as best seen in FIG. 2 of this application, the appearance of a woven cane surface made up of cane strands 32 is presented with the wells 26 formed by protuberances 24 and their octagonal bases 28 appearing to constitute the openings in conventional woven cane.

It will be noted that the strands of cane 32 forming the appearance of woven cane on the front side in FIG. 2 of this application are clearly delineated as clean-cut three-dimensional elements whereas on the backside of the formed plastic sheet as seen in FIG. 5, the rear view of the woven cane design that would be expected to appear there is not apparent at all. On the backside as seen in FIG. 5, the outstanding formation items are small projections 34 and faint straight lines 36, the entire appearance on the backside as shown in FIG. 5 being muted or blurred. It will be pointed out hereinafter how the clear-cut three-dimensional woven cane appearance is obtained on the front side as shown in FIG. 2 versus the blurred and indistinct visual impression obtained from the backside. Sufficient to say at this point that each interconnecting portion of the formed plastic sheet extending between protuberances constitutes a three-dimensional, sculptured formation in which the thickness of the plastic sheet varies throughout each portion in achieving the clear-cut impression on the front side as shown in FIG. 2 and the blurred impression on the backside as shown in FIG. 5. The plastic sheet itself is extremely thin and therefore the differences in thickness of the formed sheet in the areas between protrusions is not readily evident to the naked eye but logically follows by virtue of the two different images on the front and the back. The important aspect of the invention in this regard is the well defined image presented on the front side by the octagonal rims 30 of wells 26 and the clear-cut images of interlacing strands of cane 32. The blurred or muted image of the backside is a result of the manufacturing process and results in the formation of a strong three-dimensional sculptured sheet 16. This would be evident if the plastic sheet of the present invention were compared to a sheet in which the backside of the sheet in the portions between protuberances corresponded to the front side. There would in such case be no plastic material backing up and joining the cane strands to one another as there is in the structure of the present invention.

Component 16 of the seat cushion, in its structure and in its coaction with the remaining components of the seat is of the essence of the present invention. This element of seat cushion 10 consists of a thin, flat sheet of plastic material that has been thermally formed into a three-dimensional shape with several functions. Normally in vacuum forming and thermal forming, a draw with a one-to-one ratio is considered to be the outside practical limit. It follows that in the present structure it would be considered that the maximum diameter of the base of a protuberance 24 could be no greater than the distance between the bases of the protuberances, side wall to side wall. For fast forming free of webbing ih the prior art, the distance from side wall to side wall would usually be measurably greater than the maximum diameter of the protuberance.

In the present invention the protuberances are about 20% greater in elevation than the maximum diameter at the base. Furthermore, the diameter of the base of the protuberance is about 10% greater than the distance between protuberances side wall to side wall. In order to achieve these dimension ratios that are considered beyond practical limitations, applicants had to (a) select a material that has favorable elongation properties along with other required properties; (b) use both vacuum and pressure in thermal forming by using a pressure box as well as vacuum; and (c) use a plate assist. All these factors and molding apparatus devices are known in the art but never before utilized to achieve a three-dimensionally formed product similar to formed sheet 16.

In vacuum or thermal forming of sheet plastic material, the material remains thickest at the point where it first contacts the mold. The material then stretches and thins out as it is pulled down by vacuum and pushed down by gaseous pressure and the remaining portions of it come in actual physical contact with the mold. Additionally, in using a combination of a plate assist along with pressure and vacuum in the present invention, there is dual contact with the sheet material. This results in a smaller degree of thinning out of the plastic material as it is drawn down into the mold.

By the use of a male mold, i.e., male mold protrusions there is really present the combination of a male/female mold in that a three-dimensional product is produced with a strong protuberance on one side, the FIG. 5 side, and the best and highest amount of detail and definition on the opposite side, the FIG. 2 side. It is on the latter side that the material being formed comes in contact with the surface of the mold between protrusions which has a female woven cane configuration.

As will be apparent from an inspection of the drawings, formed plastic sheet 16 in the finished seat cushion simulates the appearance of woven cane such as shown in FIG. 2 of U.S. Pat. No. 3,722,955 but instead of the openings being present in the simulated cane, the wells 26 formed in the front side by the protrusions 24 in the mold give an appearance corresponding to the holes formed in woven cane, the formed plastic sheet 16 remaining imperforate however.

By using a male/female mold which produces in the formed product a strong protuberance in the male portion of the mold and produces in the formed product the highest and best detail and definition of the mold on the side in the female portion of the formed product opposite the protuberances and on the same side with the well or cavity of the protuberances applicants achieve a unique product. The definition and detail in the part of the formed product between the bases of the protuberances is in itself a three-dimensional surface. It has peaks and valleys and smaller cavities or wells, the latter being formed by smaller protrusions on the female portion of the die and therefore appearing as small protuberances 34 in FIG. 5. This area simulates strands 32 of woven cane and including elements 34 which on the front side of the formed product simulate the small interstices between the strands of cane. Here again where the sheet of plastic first contacts the mold part, the sheet is minutely thicker than the later-formed portions. This does not adversely affect the strength of the formed plastic sheet but does result in a clearly defined pattern, such as the woven cane pattern.

A satisfactory plastic sheet thickness before forming can range from 10 mils to one hundredth of an inch. With presently available materials a preferred thickness of the plastic sheet is between about 15 mils and about 50 mils.

Beyond the actual octagonal base 28 of the protuberance 24, the protuberance becomes fustro-conical in shape. The side wall can have a slope of approximately 10° or 15°. As an example of a satisfactory product, the elevation of the protuberance or depth of the cavity can be about 5/16ths of an inch and the diameter of the octagonal base 250 thousandths of an inch. The portion of the formed sheet extending between the nearest side walls of the bases of adjacent protuberances can be 230 thousandths of an inch and as mentioned earlier, each such portion is three-dimensional with its own peaks, valleys, crevices, apertures and other accommodations. The functional purpose of these surface configurations is to cause turbulence in the lateral movement of ventilating air. The vertical wells and cavities provide for thermal currents developing and causing air motion and in fact some bellows action. The female cavities or wells 26 along with the uneven peaks and valleys of the section between wells 26 provide a support surface for a human body of such character that the support surface actually contacts the body it is supporting in measurably less than 50% of the total supporting area. This provides for a seating or body support where the occupant is sitting on air space more than on solid space. Furthermore, air is moving between the body and support surface due to movement of the vehicle and movement of the body which tend to dissipate the heat and moisture on the skin surface of the body.

The ventilating action on the protuberance side of the formed plastic sheet is much more obvious. It is achieved by the lateral flow of air between the protuberances. As already noted the portions of plastic sheet 16 between the protuberahces on both sides are uneven and sculptured.

At this point, attention should be called to three things: (a) By having the protuberances closer together than are normally found in ventilating seats such as those disclosed in the above referred to Trotman patents, the occupant's body is less likely to push down in between the protuberances and contact the section of the sheet between protuberances when the body being supported is in contact with the woven cover sheet 17. Furthermore, in this position of the seat cushion, the additional multiplicity of protuberances makes it more comfortable for the occupant sitting on the protuberances plus effectively stabilizes the padding 20, keeping it from shifting to cause lumping or wadding up. (b) Because the protuberances are closer together when formed, plastic sheet 16 undulates, and the multiplicity of protuberances and closeness of the protuberances will still keep the occupant of the cushion from "bottoming out." (c) Because there is less thinning out of the material in the molding steps it is possible to form much better three-dimensional sculptured detail in the section of the sheet between the wells formed by the protuberances. This better three-dimensional texture in the horizontal plane creates some turbulence and upward motion of the air that is flowing laterally across the surface. This makes for better ventilation of the occupant's body surface.

When using conventional fabrics in conjunction with the formed plastic sheet of the present invention to make an automobile accessory cushion, the hinge line separating the seat cushion from the back cushion can be sewed down without any problem by locating the sewing line between two rows of protuberances or if needed two lines of sewing in the spaces between three or more rows of protuberances. This in effect creates a hinge by tightly compressing the formed plastic sheet 16, the fabric 17 and the padding 20 together along the extremely narrow line created by the sewing operation. However, when using a fabric or sheet 18 that has been heavily sized, like knitted and woven paper fabrics, it is necessary to provide a wider area for sewing down the hinge line. This is because of the stiffness of the woven material and the fact that the fabric will break if it is forced down at too sharp an angle over a line of protuberances. Nevertheless the actual hinge is again created by the tight compression of the three layers of material, this feature contributing to the formation of a strong, durable hinge.

Reference should be made to the difference between protuberances when formed on a male mold and those formed on a female mold. Protuberances when formed on a male mold are much stronger than protuberances formed on a female mold. Likewise, the highest amount of definition and detail on the section of the sheet between protuberances will be present on the side opposite the protuberance when formed on a male mold. This is as desired in the present invention where the side of the formed plastic sheet opposite to the protuberances is exposed to view and where it is the side opposite to the protuberances where the protuberances appear as wells.

It will be obvious that the protuberances of the formed plastic sheet of the present invention can be formed with points of predetermined flex or compression, such as shown in FIGS. 7 and 9 of U.S. Pat. No. 3,722,955. In the present invention however a protuberance of circular cross section is preferred for strength.

It is stressed that a very important aspect of the formed plastic sheet of the present invention is the highly textured, uneven surface of the section of the plastic sheet between the side walls of the protuberances. The texture and design of this section of the sheet can be changed at will as long as uneven surfaces are provided consisting of unbroken crevices or small channels that intersect between the bases of the protuberances. These little channels and crevices, as mentioned before, provide for the lateral passage of cooling air under an occupant and also provide for minimal body contact with the supporting surface.

Another important feature and aspect of the uneven textured surface of the section of the sheet between protuberances is that as opposed to a flat or evenly textured surface, it causes the horizontal portion to resist creasing or folding. In other words, it makes the horizontal surface roll or undulate rather than crease or break. In like manner, tendencies of the horizontal surfaces between protuberances to roll or undulate can be controlled by forming accordian pleats directionally one way or another in the horizontal section. These accordian pleats in the horizontal plane become specifically important and critical when two surfaces are laminated protuberance to protuberance or when a sheet of flat plastic material is laminated to the ends of the protuberances. The accordian pleats in the sheet portion between protuberances will enable the sandwich to roll and form fairly sharp radii without cutting off the flow of air in between the two sides of the sandwich.

The formed plastic sheet product of the present invention has uses outside of the seat cushion field for vehicles: it can be used as an upholstery material in the same manner that fabrics are used; it can be used as a cover material to fabricate an automobile accessory cushion or other accessory cushion; it can be used as a fabric by itself or as a fabric along with padding material sewed down or in some other way secured onto the protuberance side of the formed plastic sheet. The formed plastic sheet of the present invention is unique in that it becomes a truly reversible material that has a decorative appearance on one side only but ventilating function on both sides. The formed plastic sheet cover material of the present invention is both a decorative material and a functional material that provides for ventilation on both sides.

Depending on the end product application of the formed plastic sheet of the present invention, all dimensions can be increased or reduced as long as their ratios are kept substantially constant. In this manner, one may vary the thickness of the original sheet material and thus greatly affect economics by the amount of material used and the cycle time necessary to form the finished part or product. In other words, when a protuberance is being formed that is only ⅛th of an inch in elevation, the other dimensions become greatly reduced. The amount of material or the thickness of the original sheet material can come down geometrically when this is done.

Certain advantages of the present invention should be stressed: (a) On the female well or cavity 26 side of the sheet material we have accommodations for movement of air by exchange or thermal currents with provisions for lateral flow of such air and its expansion and contraction; (b) on the protuberance 24 side we provide for the lateral flow of air; (c) on the female well or cavity 26 side and the highly textured side of the section of the sheet between protuberances or wells, a good acoustical absorption property is provided by surfaces of cane 32, 32, 32; (d) on the female side or cavity 26 side there is ventilation or movement of gases derived by a bellows action which is created by vehicle motion and motion of the supported body; (e) because the formed sheet plastic even after it becomes three dimensional is still impervious to the flow of liquids or air from one side to the other side it has insulation properties; (f) by laminating a flat sheet of plastic material to the female or cavity 26 side of the three-dimensional product, air is trapped in all of the female cavities, especially the wells of the protuberances thus making the protuberances stronger and providing a cushioning effect; (g) by laminating two of the formed plastic products protuberance to protuberance in air ducting and/or an insulation wall with acoustical properties can be produced; (h) flat sheet plastic can be laminated to the protuberance side of the formed plastic sheet of the present invention to create insulated air ducting with acoustical properties on one side only; and (i) two of the three-dimensional formed plastic sheets of the present invention can be laminated protuberance to protuberance to create relatively flat sides or outside walls for easier adhesion to other flat surfaces, such as walls, ceilings and so forth.

Two examples of satisfactory plastic materials for use in the three-dimensional thermal formed sheet are HERCULES 7823 copolymer polypropylene material and UNIROYAL TPR material.

The maximum practical thickness of the plastic sheet material before forming would be about one hundredth of an inch but more desirable thicknesses would range between about 15 mils and about 50 mils before forming with presently contemplated commercial products being formed from material having an initial thickness between 30 and 45 mils in thickness.

A primary desideratum of the present invention is to produce a formed plastic sheet for underbody cushioning and ventilating structures which does not need ventilating openings. Obviously, the addition of ventilating openings which do not interfere with the ornamental aspects of the simulated woven cane nor the spacing function of the protuberances would result in a structure having the advantages of the present invention and be embraced within the scope of the appended claims.

The described embodiments are to be considered in all respects as illustrative and not restrictive since the invention may be embodied in other specific forms without departing from its spirit or essential characteristics. Therefore the scope of the invention is indicated by the claims rather than by the foregoing description, and all changes which come within the meaning and range of the equivalents of the claims are intended to be embraces therein.

We claim:

1. Underbody cushioning and ventilating structure comprising a resilient first sheet member originally of uniform thickness throughout having an outside surface and an inside surface, a foraminous second sheet member having an outside surface and an inside surface, means attaching the marginal portions of the first and second sheet members to one another with their inside surfaces opposed to form an enclosed space between the sheet members, protuberances integrally formed from the material of the first sheet member and spaced from one another along all dimensions of the first sheet member, each protuberance projecting inwardly from the inside surface of the first sheet member toward the inside surface of the second sheet member, the protuberances being formed in the first sheet member by the application of heat and pressure to a planar piece of the material of the first sheet member, the material of the first sheet member extending between the protuberances being formed by the application of heat and pressure so as to form on the outside surface a continuous pattern of minor cavities and contiguous raised surfaces, the thickness dimension of the portions of the formed sheet between protuberances being non-uniform and shaped to cause turbulence in air currents flowing in contact with the outside surface thereof, the protuberances having a height and projecting toward the inside surface of the second sheet a distance such that the first and second sheet members are maintained in spaced ventilating relation by coaction of the protuberances and the inside surface of the second sheet member when the structure is supported by a supporting surface on the outside surface of one sheet member and is supporting a body on the outside surface of the other sheet member.

2. The structure of claim 1 wherein the material of the first sheet member extending between the protuberances is formed by the application of heat and pressure so as to simulate woven cane material with simulated openings when viewed from the outside surface of the first sheet member, and the internal surfaces of the protuberances when viewed from the outside surface of the first sheet member form the simulated openings in the simulated woven cane material.

3. The structure of claim 2 wherein there is padding material in the enclosed space, the protuberances project into contact with the padding material, and the protuberances, the padding material and inside surface of the second sheet coact to maintain the spaced ventilating relation between the first and second sheet members.

4. The structure of claim 1 wherein there is padding material in the enclosed space, the protuberances project into contact with the padding material, and the protuberances, the padding material and inside surface of the second sheet coact to maintain the spaced ventilating relation between the first and second sheet members.

5. The structure of claim 1 wherein each protuberance has a height dimension about 20% greater than the maximum cross sectional dimension of the protuberance at the base, and the maximum cross sectional dimension of the protuberance at the base is about 10% greater than the shortest distance between adjacent protuberances.

6. The structure of claim 4 wherein the underbody cushioning and ventilating structure is made up of a seat portion and a back portion and a hinge portion between the seat portion and the hinge portion, the hinge portion being integrally joined to the seat portion and the back portion by virtue of the three portions incorporating a single said resilient first sheet member, and wherein the hinge portion includes a row of sewing extending across an intermediate portion of the structure between two rows of protuberances, the sewing holding first and second sheet members together with the padding material compressed therebetween to thereby form a strong durable hinge structure.

7. The structure of claim 5 wherein
the underbody cushioning and ventilating structure is made up of a seat portion and a back portion and a hinge portion between the seat portion and the hinge portion, the hinge portion being integrally joined to the seat portion and the back portion by virtue of the three portions incorporating a single said resilient first sheet member, and wherein the hinge portion includes a row of sewing extending across an intermediate portion of the structure between two rows of protuberances, the sewing holding first and second sheet members together witn the padding material compressed therebetween to thereby form a strong durable hinge structure.

8. The structure of claim 1, 2, 3, 4, 5, 6 or 7 wherein the initial thickness dimension of the sheet is between 15 and 50 mils.

9. The underbody cushioning and ventilating structure of claims 1, 2, 3, 4, 5, 6 or 7 wherein
the protuberances are all uniformly spaced and identical in size and shape, the base of each protuberance is octagonal and the remainder of each protuberance of truncated conical form of decreasing diameter as the protuberance extends away from the base, and the continuous pattern of minor cavities and contiguous raised surfaces simulate woven cane when viewed from the outside surface of the formed sheet.

* * * * *